United States Patent Office  3,220,986
Patented Nov. 30, 1965

3,220,986
2-VINYLOXYETHYL SULFIDE COMPOUNDS AND POLYMERIZATION PRODUCTS THEREOF
Thomas M. Harris, South Charleston, and John W. Lynn, Charleston, W. Va., assignors to Union Carbide Corporation, a corporation of New York
No Drawing. Filed Dec. 27, 1960, Ser. No. 78,311
6 Claims. (Cl. 260—79.7)

This invention relates to novel 2-vinyloxyethyl sulfide compounds, to processes for their production, and to the polymerization of these compounds.

The novel 2-vinyloxyethyl sulfide compounds of the instant invention can be depicted by the general formula $$CH_2=CH-O-CH_2-CH_2-S-R$$

wherein R is a member selected from the group consisting of hydrocarbon radicals free of aliphatic unsaturation having from one to twenty carbon atoms, including alkyl and aryl radicals, and hydroxyhydrocarbon radicals free of aliphatic unsaturation having from one to twenty carbon atoms with no more than one hydroxyl group attached to any given carbon atom, including hydroxyalkyl and hydroxyaryl radicals. Preferably R is a radical having from one to twelve carbon atoms. Illustrative of the 2-vinyloxyethyl sulfide compounds of the instant invention are such compounds as 3-thia-6-oxa-7-octenol, 2-methylmercaptoethyl vinyl ether, 2-(propylmercapto)ethyl vinyl ether, 2-(butylmercapto)ethyl vinyl ether, 2-(2-ethylhexyl)ethyl vinyl ether, 2-(octylmercapto)ethyl vinyl ether, 2-(dodecylmercapto)ethyl vinyl ether, 2-(hexadecylmercapto)ethyl vinyl ether, 2-(octadecylmercapto)ethyl vinyl ether, 2-(eicosylmercapto)ethyl vinyl ether, 2-phenylmercaptoethyl vinyl ether, 2-(chrysenylmercapto)ethyl vinyl ether, 2-(pyrenylmercapto)ethyl vinyl ether, 2-(2-fluorenylmercapto)-ethyl vinyl ether, 2-(2-acenaphthenylmercapto)ethyl vinyl ether, 2-(o-tolylmercapto)ethyl vinyl ether, 2-(2,4-xylylmercapto)ethyl vinyl ether, 2-(m-cumenylmercapto)ethyl vinyl ether, 2-(2,3-xylylmercapto)ethyl vinyl ether, 2-(mesitylmercapto)ethyl vinyl ether, 2-(2-naphthylmercapto)ethyl vinyl ether, 2-(2-anthrylmercapto)ethyl vinyl ether, 2-(4-biphenylmercapto)ethyl vinyl ether, 2-(2-phenanthrylmercapto)ethyl vinyl ether, 4-thia-7-oxa-8-nonenol, 5-thia-8-oxa-9-decenol, 7-thia-10-oxa-11-dodecenol, 9-thia-12-oxa-13-tetradecenol, 13-thia-16-oxa-17-octadeconal, 19-thia-22-oxa-23-tetracosenol, 21-thia-24-oxa-25-hexacosenol, 2-methyl-4-thia-7-oxa-8-nonenol, 2-methyl-5-thia-8-oxa-9-decenol, 6-ethyl-9-thia-12-oxa-13-tetradecenol, 11-hydroxypropyl-13-thia-16-oxa-17-octadenol, 6-hydroxyethyl-19-thia-22-oxa-23-tetracosenol, 4-thia-7-oxa-8-nonene-1,2-diol, 5-thia-8-oxa-9-decene-1,3-diol, 7-thia-10-oxa-11-dodecene-1,3-diol, 9-thia-12-oxa-13-tetradecene-1,5-diol, 13-thia-16-oxa-17-octadecene-1,6-diol, 19-thia-22-oxa-23-tetracosene-1,12-diol, 7-thia-10-oxa-11-dodecene-1,3,5-triol, 2-(2-hydroxyphenylmercapto)ethyl vinyl ether, 2-[(2-hydroxyethyl)-phenylmercapto]ethyl vinyl ether, 2-(3-hydroxychrysenylmercapto)ethyl vinyl ether, 2-(3-hydroxypyrenylmercapto)ethyl vinyl ether, 2-(1,4-dihydroxy-2-fluorenylmercapto)ethyl vinyl ether, 2-(6,8-dihydroxy-2-naphthylmercapto)ethyl vinyl ether, 2-(4,5,8-trihydroxy-2-anthrylmercapto)ethyl vinyl ether, 2-(4,5,8-trihydroxy-2-phenanthrylmercapto)ethyl vinyl ether, and the like.

The novel 2-vinyloxyethyl sulfide compounds of the instant invention can be produced by the reaction of a suitable thiol compound with a 2-haloethyl vinyl ether in the presence of a strongly alkaline condensation agent.

The thiol compounds which can be employed as starting materials in preparing the novel 2-vinyloxyethyl sulfide compounds of the instant invention can be depicted by the general formula $$R-S-H$$

wherein R is as above defined. Illustrative of such starting materials are such compounds as 1-dodecanethiol, 2-propanethiol, 2-ethylhexanethiol, methanethiol, 1-eicosanethiol, ethanethiol, 2-methylbutanethiol, 1-octadecanethiol, 1-propanethiol, 1-butanethiol, tert-butanethiol, phenylmethanethiol, 1-octanethiol, benzenethiol, 2-methylbenzenethiol, 3-methylbenzenethiol, 4-methylbenzenethiol, 4-biphenylthiol, 2-naphthalenethiol, 2,3-dimethylbenzenethiol, 3,4 - dimethylbenzenethiol, 2,5-dimethylbenzenethiol, 2-anthracenethiol, 2-phenanthrenethiol, 2-mercaptoethanol, 2-hydroxy-3-mercaptopropanol, 11-mercaptohendecanol, 20-mercaptoeicosanol, 4-mercaptophenol, 3-mercaptophenol, 2-mercaptophenol, 3-hydroxy-4-mercaptophenol, 2-mercapto-5-methylphenol, 2-hydroxymethylbenzenethiol, 2-hydroxymethyl-3-methylbenzenethiol, 4-methylmercaptophenol, 1,4-dihydroxy-2-fluorenethiol, 6,8-dihydroxy-2-naphthalenethiol, 4,5,8-trihydroxy-2-anthracenethiol, 4,5,8 - trihydroxy-2-phenanthracenethiol, and the like.

The 2-haloethyl vinyl ethers which can be employed as starting materials in preparing the novel 2-vinyloxyethyl sulfide compounds of the instant invention can be depicted by the general formula $$CH_2=CH-O-CH_2-CH_2-X$$

wherein X is a halogen radical, including fluorine, chlorine, bromine and iodine radicals.

The process of the instant invention, which comprises reacting a thiol compound with a 2-haloethyl vinyl ether in the presence of an alkaline condensation agent, can be illustrated by the following graphic equation $$CH_2=CH-O-CH_2-CH_2-X + RSH \xrightarrow{\text{Base}}$$
$$CH_2=CH-O-CH_2-CH_2-S-R + HX$$

wherein R and X are as above defined. By way of illustration, 3-thia-6-oxa-7-octenol can be prepared by the reaction of 2-mercaptoethanol with 2-chloroethyl vinyl ether, and 2-methylmercaptoethyl vinyl ether can be prepared by the reaction of methanethiol with 2-chloroethyl vinyl ether.

Since one mole of thiol compound reacts with one mole of 2-haloethyl vinyl ether to produce one mole of 2-vinyloxyethyl sulfide compound, it is preferable to employ equimolar amounts of these reactants when effecting reaction according to the process of the instant invention; however, an excess of either reactant, up to about 3 times the stoichiometric equivalent, can also be employed whenever it is desirable to do so.

In order to effect reaction between a thiol compound and a 2-haloethyl vinyl ether according to the process of the instant invention, the presence of an alkaline condensation agent, preferably a strongly alkaline condensation agent, in the reaction mixture is necessary. Such alkaline condensation agents include the oxides, hydroxides, carbonates, sulfites, amides and alcoholates of the alkali or alkaline earth metals, as well as the alkali or alkaline earth metals themselves, and such basic nonmetallic hydroxides as the quaternary ammonium hydroxides. Specific examples of the condensation agents which can be employed include sodium hydroxide, potassium hydroxide, lithium hydroxide, calcium hydroxide, sodium oxide, sodium carbonate, potassium carbonate, lithium carbonate, calcium carbonate, sodium sulfite, potassium sulfite, lithium sulfite, calcium sulfite, sodamide, potassium ethylate, potassium tertiary amylate, trimethylbenzylammonium hydroxide, benzyltriethylammonium hydroxide, and dimethyldibenzylammonium hydroxide.

Since the alkaline compound serves as a condensation agent, a stoichiometric amount of such compound is necessary to effect full condensation between the thiol compound of the 2-haloethyl vinyl ether. If less than the stoichiometric amount of the alkaline compound is employed reaction between the thiol compound and the 2-haloethyl vinyl ether will be incomplete. An amount greater than the stoichiometric amount is unnecessary, but can be employed if desired.

Reaction according to the process of the instant invention readily occurs at temperatures ranging from as low as −30° C. to as high as 200° C., but is preferably effected at temperatures ranging from about 20° C. to about 150° C.

Atmospheric pressure is usually employed in effecting reaction according to the process of the instant invention. However, pressures both above and below atmospheric pressure, for example pressures ranging from as low as 100 mm. Hg to as high as 7600 mm. Hg, can also be employed whenever it is desirable to do so.

Reaction according to the process of the instant invention may be effected in an inert liquid solvent. By an "inert liquid solvent" is meant a liquid solvent in which the starting materials are soluble to an extent whereby they are brought into reactive contact and which itself is essentially nonreactive under the conditions of the reaction. Suitable inert liquid solvents which can be employed include hydrocarbons such as hexane, cyclohexane, heptane, benzene, toluene and the like, ethers such as isopropyl ether, ethyl ether, dioxane, tetrahydrofuran and the like, and alcohols such as methanol, isopropanol, isobutanol and the like. In general, an amount of solvent ranging from 0 to 25 times, preferably from 1 to 10 times, the weight of reactants present can be effectively employed.

The novel 2-vinyloxyethyl sulfide compounds of the instant invention find wide use in the preparation of polymeric materials. Thus, such compounds, because of the vinyl group present therein, can be readily homopolymerized, or interpolymerized with one or more polymerizable organic compounds, such as styrene, butadiene, methyl acrylate, methyl methacrylate, vinyl acetate, vinyl chloride, vinylidene chloride, acrylonitrile, methacrylonitrile, vinylidene cyanide, acrylamide methacrylamide, maleic anhydride, N-vinylacetamide, vinyl methyl ether and the like. The polymeric materials produced by polymerizing the novel 2-vinyloxyethyl sulfide compounds of the instant invention are useful in forming films, fibers and coatings.

Polymerization of the novel 2-vinyloxyethyl sulfide compounds of the instant invention can be effected by means of heat, light, or a suitable vinyl polymerization catalyst. Preferably, polymerization is effected by heating in the presence of a polymerization catalyst in order to shorten the reaction time. Temperatures ranging from as low as 30° C. to as high as 150° C. are generally effective for this purpose. Lewis type acids, such as boron trifluoride, aluminum trichloride and stannic chloride, are suitable catalysts for effecting homopolymerization of the 2-vinyloxyethyl sulfide compounds of the instant invention, while peroxides and azo compounds are suitable catalysts for effecting copolymerization of such compounds and other polymerizable organic compounds. Among the peroxides which can be employed as catalysts may be mentioned hydrogen peroxide, barium peroxide, magnesium peroxide, diethyl peroxide, distearyl peroxide, acetyl peroxide, stearoyl peroxide and acetyl benzoyl peroxide. Illustrative examples of azo compounds which can be employed as catalysts include α,α'-azo-bis-isobutyronitrile, 2,2-dicyano-bis-azobenzene, and the like.

The interpolymers obtained by interpolymerizing the novel 2-vinyloxyethyl sulfide compounds of the instant invention can contain from as low as 0.1 molar percent to as high as 50 molar percent of combined 2-vinyloxyethyl sulfide compound.

The following examples are set forth for purposes of illustration so that those skilled in the art may better understand this invention, and it should be understood that they are not to be construed as limiting this invention in any manner.

EXAMPLE I

*Preparation of 3-thia-6-oxa-7-octenol*

To a two-liter flask equipped with a stirrer, a thermometer, and reflux condenser, were charged, 700 milliliters of isopropanol, 156 grams of 2-mercaptoethanol (2 moles), and 100 grams of sodium hydroxide (2.5 moles). After most of the sodium hydroxide had dissolved, 213 grams of 2-chloroethyl vinyl ether (2 moles) were added to the mixture. The resulting mixture was stirred and heated at its refluxing temperature (80° C.) for five hours. At the end of this time, the heating was discontinued and the mixture was stirred overnight at room temperature. The next morning the mixture was filtered to remove precipitated salts, and the filtrate obtained thereby was distilled at atmospheric pressure to remove isopropanol. Benzene was added to the liquid residue and the resulting mixture was washed with an aqueous solution of sodium hydroxide (to remove unreacted 2-mercaptoethanol) and then dried over sodium sulfate. When the dried mixture was distilled, 251 grams of 3-thia-6-oxa-7-octenol, boiling at a temperature of 102.5° C. to 107° C. at 5 mm. Hg pressure, were collected. This represented a yield of about 85 percent of theoretical. The product had an index of refraction of 1.5007 at 30° C., and a molecular weight of 151 (as determined by hydroxyl analysis). The product was identified as 3-thia-6-oxa-7-octenol by its infrared absorption spectrum and elemental analysis. *Analysis.*—Calculated for $C_6H_{12}SO_2$: C, 48.62%; H, 8.16%; S, 21.63%. Found: C, 48.45%; H, 7.85%; S, 21.44%.

EXAMPLE II

*Preparation of 2-methylmercaptoethyl vinyl ether*

An admixture of 115 grams of methanethiol (2.4 moles), 110 grams of sodium hydroxide (2.75 moles) and 800 milliliters of isopropanol was prepared and stirred while 250 grams of 2-chloroethyl vinyl ether (2.35 moles) were added thereto in a dropwise manner over a period of ninety minutes. The addition of the 2-chloroethyl vinyl ether caused the mixture to reflux. After the addition of the 2-chloroethyl vinyl ether was completed, the resulting mixture was heated at its refluxing temperature for thirty minutes. Isopropanol was then removed from the mixture by vacuum distillation. The remaining residue was then filtered to remove precipitated salts. Benzene was added to the filtrate and the resulting mixture was washed with an aqueous solution of sodium hydroxide (to remove unreacted methanethiol). The washed solution was then distilled and 166 grams of 2-methylmercaptoethyl vinyl ether, boiling at a temperature of 72° C. to 74° C. at 8 mm. Hg pressure, were collected. This represented a yield of about 60 percent of theoretical. The product had an index of refraction of 1.4710–1.4716 at 30° C., and was identified as 2-methylmercaptoethyl vinyl ether by its infrared absorption spectrum and elemental analysis. *Analysis.*—Calculated for $C_5H_{10}SO$: C, 50.83%; H, 8.53%; S, 27.12%. Found: C, 50.68%; H, 8.54%; S, 27.85%.

EXAMPLE III

*Preparation of 2-(propylmercapto)ethyl vinyl ether*

An admixture of 76 grams of 1-propanethiol (1.0 mole), 50 grams of sodium hydroxide (1.25 moles) and 500 milliliters of isopropanol was prepared and stirred while 106.5 grams of 2-chloroethyl vinyl ether (1 mole) were gradually added thereto while maintaining the mixture at a temperature of 50° C. by means of a water bath. After the addition of the 2-chloroethyl vinyl ether was completed, the resulting mixture was heated at its refluxing temperature (85° C.) for four hours. Isopropanol was then removed from the mixture by vacuum distillation.

Benzene was then added to the remaining residue and the resulting mixture was washed with an aqueous solution of sodium hydroxide (to remove unreacted 1-propanethiol). The washed solution was dried over sodium sulfate. When the dried mixture was distilled, 118 grams of 2-(propylmercapto)ethyl vinyl ether, boiling at a temperature of 65.5° C. to 68° C. at 8 mm. Hg pressure were collected. This represented a yield of about 81 percent of theoretical. The product had an index of refraction of 1.4671–1.4673 at 30° C., and was identified as 2-(propylmercapto)ethyl vinyl ether by its infrared absorption spectrum and elemental analysis. *Analysis.*—Calculated for $C_7H_{14}SO$: C, 57.55%; H, 9.65%; S, 21.92%. Found: C, 57.86%; H, 10.02%; S, 22.44%.

EXAMPLE IV

*Preparation of 2-(butylmercapto)ethyl vinyl ether*

An admixture of 90 grams of 1-butanethiol (1.0 mole), 50 grams of sodium hydroxide (1.25 moles) and 500 milliliters of isopropanol was prepared and stirred at its refluxing temperature while 106.5 grams of 2-chloroethyl vinyl ether (1.0 mole) were added thereto over a period of two hours. After the addition of the 2-chloroethyl vinyl ether was completed, the resulting mixture was heated at its refluxing temperature for six hours. Isopropanol was then removed by distillation. The remaining residue was then filtered to remove precipitated salts. When the filtrate was distilled, 123 grams of 2-(butylmercapto)ethyl vinyl ether, boiling at a temperature of 86° C. to 88° C. at 11 mm. Hg pressure, were collected. This represented a yield of about 78 percent of theoretical. The product had an index of refraction of 1.4656–1.4665 at 30° C., and was identified as 2-(butylmercapto)ethyl vinyl ether by its infrared absorption spectrum and elemental analysis. *Analysis.*—Calculated for $C_8H_{16}SO$: C, 59.95%; H, 10.07%; S, 20.00%. Found: C, 60.76%; H, 10.23%; S, 20.05%.

EXAMPLE V

*Preparation of 2-(octylmercapto)ethyl vinyl ether*

An admixture of 57 grams of 1-octanethiol (0.39 mole), 20 grams of sodium hydroxide (0.50 mole) and 300 milliliters of isopropanol was prepared and stirred at a temperature of 80° C. while 42 grams of 2-chloroethyl vinyl ether (0.39 mole) were added thereto over a period of forty-five minutes. After the addition of the 2-chloroethyl vinyl ether was completed, the resulting mixture was heated at its refluxing temperature for 6 hours. At the end of this time, the mixture was filtered to remove precipitated salts, and the filtrate obtained thereby was distilled at atmospheric pressure to remove isopropanol. Benzene was added to the semi-solid residue, and the resulting mixture was washed successively with (1) water, (2) an aqueous solution of sodium hydroxide, and finally with (3) water again. The washed solution was then dried over sodium sulfate and distilled. About 55 grams of 2-(octylmercapto)ethyl vinyl ether, boiling at a temperature of 72° C. to 77° C. at 0.10 mm. Hg pressure, were collected. This represented a yield of about 65 percent of theoretical. The product had an index of refraction of 1.4650–1.4663 at 30° C., and was identified as 2-(octylmercapto)ethyl vinyl ether by its infrared absorption spectrum and elemental analysis. *Analysis.*—Calculated for $C_{12}H_{24}SO$: C, 66.62%; H, 11.18%; S, 14.81%. Found: C, 66.94%; H, 11.25%; S, 15.04%.

EXAMPLE VI

*Preparation of 2-(dodecylmercapto)ethyl vinyl ether*

An admixture of 190 grams of dodecanethiol (0.94 mole), 48 grams of sodium hydroxide (1.2 moles) and 1,000 milliliters of isopropanol was prepared and maintained at a temperature of 80° C. while 110 grams of 2-chloroethyl vinyl ether (1.03 moles) were added thereto in a dropwise manner. After the addition of the 2-chloroethyl vinyl ether was completed, the resulting mixture was heated at its refluxing temperature for 4 hours. At the end of this time, the mixture was filtered to remove precipitated salts, and the filtrate obtained thereby was distilled at atmospheric pressure to remove isopropanol. Benzene was added to the semi-solid residue and the resulting mixture was washed successively with (1) water, (2) an aqueous solution of sodium hydroxide, and finally with (3) water again. The washed solution was then dried over magnesium sulfate and distilled. About 171 grams of 2-(dodecylmercapto)ethyl vinyl ether, boiling at a temperature of 110° C. to 120° C. at 0.08 mm. Hg pressure, were collected. This represented a yield of about 63 percent of theoretical. The product had an index of refraction of 1.4659–1.4662 at 30° C., and was identified as 2-(dodecylmercapto)ethyl vinyl ether by its infrared absorption spectrum and elemental analysis. *Analysis.*—Calculated for $C_{16}H_{32}SO$: C, 70.54%; H, 11.84%; S, 11.76%. Found: C, 70.76%; H, 11.94%; S, 11.21%.

EXAMPLE VII

*Preparation of 2-phenylmercaptoethyl vinyl ether*

An admixture of 220 grams of benzenethiol (2.0 moles), 100 grams of sodium hydroxide (2.5 moles) and 1,000 milliliters of isopropanol was prepared and maintained at a temperature of 70° C. while 225 grams of 2-chloroethyl vinyl ether (2.1 moles) were added thereto in a dropwise manner over a period of two hours. After the addition of the 2-chloroethyl vinyl ether was completed, the resulting mixture was heated at its refluxing temperature for 6 hours. At the end of this time, the mixture was cooled and filtered to remove precipitated salts. When the filtrate was distilled, 289 grams of 2-phenylmercaptoethyl vinyl ether, boiling at a temperature of 89° C. to 91° C. at 2 mm. Hg pressure, were collected. This represented a yield of about 80 percent of theoretical. The product had an index of refraction of 1.5573–1.5576, and was identified as 2-phenylmercaptoethyl vinyl ether by its infrared absorption spectrum and elemental analysis. *Analysis.*—Calculated for $C_{10}H_{12}SO$: C, 66.65%; H, 6.71%. Found: C, 66.65%; H, 6.74%.

EXAMPLE VIII

*Copolymerization of 3-thia-6-oxa-7-octenol with vinylidene chloride*

To a nitrogen-purged Pyrex polymerization tube (14 mm. by 12") were charged 7.0 grams of vinylidene chloride, 3.0 grams of 3-thia-6-oxa-7-octenol and 0.1 gram of azo-bis-isobutyronitrile. After purging the tube with nitrogen, the tube was cooled in a Dry Ice bath and sealed. The tube was then warmed and rocked in a water bath maintained at a temperature of 50° C. for 1.42 hours. At the end of this time, the tube was opened and isopropanol was added to the contents thereof. The resulting mixture was filtered, and the precipitate collected was dried in a forced air oven at a temperature of 50° C. About 1.9 grams of copolymer were recovered in this manner. This represented a yield of about 19 percent of the theoretical yield of copolymer. The copolymer had a chlorine content of 31 percent by weight, indicating the presence of 42 percent by weight of combined vinylidene chloride.

EXAMPLE IX

*Copolymerization of 3-thia-6-oxa-7-octenol with vinylidene chloride*

To a nitrogen-purged Pyrex polymerization tube (14 mm. by 12") were charged 7.0 grams of vinylidene chloride, 3.0 grams of 3-thia-6-oxa-7-octenol and 0.1 gram of azo-bis-isobutyronitrile. After purging the tube with nitrogen, the tube was cooled in a Dry Ice bath and sealed. The tube was then warmed and rocked in a water bath maintained at a temperature of 50° C. for 1.08 hours. At the end of this time, the tube was opened and isopropanol was added to the contents thereof. The resulting mixture was filtered, and the precipitate collected was dried in a forced air oven at a temperature of 50° C. About 1.2 grams of copolymer were recovered in this manner. This represented a yield of about 12 percent of the theoretical yield of copolymer. The copolymer had a chlorine content of 33.1 percent by weight, indicating the presence of 45 percent by weight of combined vinylidene chloride.

EXAMPLE X

*Copolymerization of 3-thia-6-oxa-7-octenol with acrylonitrile*

To a nitrogen-purged Pyrex polymerization tube (14 mm. by 12″) were charged 5.0 grams of 3-thia-6-oxa-7-octenol, 5.0 grams of acrylonitrile and 0.1 gram of azo-bis-isobutyronitrile. After purging the tube with nitrogen, the tube was cooled in a Dry Ice bath and sealed. The tube was then warmed and rocked in a water bath maintained at a temperature of 50° C. for 3.9 hours. At the end of this time, the tube was opened and isopropanol was added to the contents thereof. The resulting mixture was filtered, and the precipitate collected was dried in a forced air oven at a temperature of 50° C. About 3.4 grams of copolymer were recovered in this manner. This represented a yield of about 34 percent of the theoretical yield of copolymer, and a conversion rate of 8.7 percent per hour. The copolymer had a nitrogen content of 10.44 percent by weight, indicating the presence of 40 percent by weight of combined acrylonitrile.

EXAMPLE XI

*Copolymerization of 3-thia-6-oxa-7-octenol with acrylonitrile*

To a nitrogen-purged Pyrex polymerization tube (14 mm. by 12″) were charged 7.0 grams of 3-thia-6-oxa-7-octenol, 3.0 grams of acrylonitrile and 0.1 gram of azo-bis-isobutyronitrile. After purging the tube with nitrogen, the tube was cooled in a Dry Ice bath and sealed. The tube was then warmed and rocked in a water bath maintained at a temperature of 50° C. for 3.9 hours. At the end of this time, the tube was opened and isopropanol was added to the contents thereof. The resulting mixture was filtered, and the precipitate collected was dried in a forced air oven at a temperature of 50° C. About 2.9 grams of copolymer were recovered in this manner. This represented a yield of about 29 percent of the theoretical yield of copolymer, and a conversion rate of 7.8 percent per hour. The copolymer had a nitrogen content of 9.11 percent by weight, indicating the presence of 35 percent by weight of combined acrylonitrile.

EXAMPLE XII

*Copolymerization of 2-(propylmercapto)ethyl vinyl ether with vinylidene chloride*

To a nitrogen-purged Pyrex polymerization tube (14 mm. by 12″) were charged 7.0 grams of vinylidene chloride, 3.0 grams of 2-(propylmercapto)ethyl vinyl ether and 0.1 gram of azo-bis-isobutyronitrile. After purging the tube with nitrogen, the tube was cooled in a Dry Ice bath and sealed. The tube was then warmed and rocked in a water bath maintained at a temperature of 50° C. for 7.5 hours. At the end of this time, the tube was opened and isopropanol was added to the contents thereof. The resulting mixture was filtered, and the precipitate collected was dried in a forced air oven at a temperature of 50° C. About 1.7 grams of copolymer were recovered in this manner. This represented a yield of about 17 percent of the theoretical yield of copolymer. The copolymer had a chlorine content of 61.9 percent by weight, indicating the presence of 84.4 percent by weight of combined vinylidene chloride. The copolymer had a reduced viscosity of 0.07 in dimethylformamide at 30° C. using a solution of 0.2 gram of polymer per 100 milliliters of solution.

Reduced viscosity ($I_R$) is a measure of the molecular weight of a polymer, and can be defined by the equation $$I_R = \frac{\frac{\Delta N}{N_0}}{C}$$

wherein $\Delta N$ is the difference in seconds between the flow-time of a solution of polymer through a capillary viscometer and the flow-time of the solvent, $N_0$ represents the flow-time of the solvent, and C is the concentration of polymer in said solution in grams per 100 ml. of solution.

EXAMPLE XIII

*Copolymerization of 2-(propylmercapto)ethyl vinyl ether with vinyl chloride*

To a nitrogen-purged Pyrex polymerization tube (14 mm. by 12″) were charged 7.0 grams of vinyl chloride, 3.0 grams of 2-(propylmercapto)ethyl vinyl ether and 0.1 gram of azo-bis-isobutyronitrile. After purging the tube with nitrogen, the tube was cooled in a Dry Ice bath and sealed. The tube was then rocked in a water bath maintained at a temperature of 50° C. for 4 hours. At the end of this time, the tube was opened and isopropanol was added to the contents thereof. The resulting mixture was filtered, and the precipitate collected was dried in the forced air oven at a temperature of 50° C. About 1.3 grams of copolymer were recovered in this manner. This represented a yield of about 13 percent of the theoretical yield of copolymer, and a conversion rate of 3.25 percent per hour. The copolymer had a chlorine content of 48.7 percent by weight, indicating the presence of 85.75 percent by weight of combined vinyl chloride. The copolymer had a reduced viscosity of 0.15 in cyclohexanone at 30° C. using a solution of 0.2 gram of polymer per 100 milliliters of solution.

EXAMPLE XIV

*Copolymerization of 2-(octylmercapto)ethyl vinyl ether with vinylidene chloride*

To a nitrogen-purged Pyrex polymerization tube (14 mm. by 12″) were charged 7.0 grams of vinylidene chloride, 3.0 grams of 2-(octylmercapto)ethyl vinyl ether and 0.1 gram of azo-bis-isobutyronitrile. After purging the tube with nitrogen, the tube was cooled in a Dry Ice bath and sealed. The tube was then rocked in a water bath maintained at a temperature of 50° C. for 7.5 hours. At the end of this time, the tube was opened and isopropanol was added to the contents thereof. The resulting mixture was filtered, and the precipitate collected was dried in the forced air oven at a temperature of 50° C. About 1.0 gram of copolymer was recovered in this manner. This represented a yield of about 10 percent of the theoretical yield of copolymer, and a conversion rate of 1.3 percent per hour. The copolymer had a chlorine content of 61.8 percent by weight, indicating the presence of 84.4 percent by weight of combined vinylidene chloride. The copolymer had a reduced viscosity of 0.062 in dimethyl formamide at 30° C. using a solution of 0.2 gram of polymer per 100 milliliters of solution.

EXAMPLE XV

*Copolymerization of 2-(butylmercapto)ethyl vinyl ether with vinyl chloride*

To a nitrogen-purged Pyrex polymerization tube (14 mm. by 12″) were charged 7.0 grams of vinyl chloride, 3.0 grams of 2-(butylmercapto)ethyl vinyl ether and 0.1 gram of azo-bis-isobutyronitrile. After purging the tube with nitrogen, the tube was cooled in a Dry Ice bath and sealed. The tube was then rocked in a water bath maintained at a temperature of 50° C. for 2.5 hours. At the end of this time, the tube was opened and isopropanol was added to the contents thereof. The resulting mixture was filtered, and the precipitate collected was dried in the forced air oven at a temperature of 50° C. About 1.65 grams of copolymer were recovered in this manner. This represented a yield of about 16.5 percent of the theoretical yield of copolymer, and a conversion rate of 6.6 percent per hour. The copolymer had a chlorine content of 47.6 percent by weight, indicating the presence of 83.8 percent by weight of combined vinyl chloride. The copolymer had a reduced viscosity of 0.22 in cyclohexanone at 30° C. using a solution of 0.2 gram of polymer per 100 milliliters of solution.

EXAMPLE XVI

*Copolymerization of 2-methylmercaptoethyl vinyl ether with vinylidene chloride*

To a nitrogen-purged Pyrex polymerization tube (14 mm. by 12″) were charged 7.0 grams of vinylidene chloride, 3.0 grams of 2-methylmercaptoethyl vinyl ether and 0.1 gram of azo-bis-isobutyronitrile. After purging the tube with nitrogen, the tube was cooled in a Dry Ice bath and sealed. The tube was then rocked in a water bath maintained at a temperature of 50° C. for 6 hours. At the end of this time, the tube was opened and isopropanol was added to the contents thereof. The resulting mixture was filtered, and the precipitate collected was dried in a forced air oven at a temperature of 50° C. About 2.5 grams of copolymer were recovered in this manner. This represented a yield of about 25 percent of the theoretical yield of copolymer, and a conversion rate of 4.2 percent per hour. The copolymer had a chlorine content of 61.4 percent by weight, indicating the presence of 83.9 percent by weight of combined vinylidene chloride. The copolymer had a reduced viscosity of 0.167 in dimethyl formamide at 30° C. using a solution of 0.2 gram of polymer per 100 milliliters of solution.

EXAMPLE XVII

*Copolymerization of 2-methylmercaptoethyl vinyl ether with vinyl chloride*

To a nitrogen-purged Pyrex polymerization tube (14 mm. by 12″) were charged 7.0 grams of vinyl chloride, 3.0 grams of 2-methylmercaptoethyl vinyl ether and 0.1 gram of azo-bis-isobutyronitrile. After purging the tube with nitrogen, the tube was cooled in a Dry Ice bath and sealed. The tube was then rocked in a water bath maintained at a temperature of 50° C. for 3.67 hours. At the end of this time, the tube was opened and isopropanol was added to the contents thereof. The resulting mixture was filtered, and the precipitate collected was dried in a forced air oven at a temperature of 50° C. About 1.7 grams of copolymer were recovered in this manner. This represented a yield of about 17 percent of the theoretical yield of copolymer, and a conversion rate of 4.6 percent per hour. The copolymer had a chlorine content of 47.6 percent by weight, indicating the presence of 83.9 percent by weight of combined vinyl chloride. The copolymer had a reduced viscosity of 0.227 in cyclohexanone at 30° C. using a solution of 0.2 gram of polymer per 100 milliliters of solution.

EXAMPLE XVIII

*Copolymerization of 2-phenylmercaptoethyl vinyl ether with vinyl chloride*

To a nitrogen-purged Pyrex polymerization tube (14 mm. by 12″) were charged 7.0 grams of vinyl chloride, 3.0 grams of 2-phenylmercaptoethyl vinyl ether and 0.1 gram of azo-bis-isobutyronitrile. After purging the tube with nitrogen, the tube was cooled in a Dry Ice bath and sealed. The tube was then rocked in a water bath maintained at a temperature of 50° C. for 3.67 hours. At the end of this time, the tube was opened and isopropanol was added to the contents thereof. The resulting mixture was filtered and the precipitate collected was dried in a forced air oven at a temperature of 50° C. About 1.3 grams of copolymer were recovered in this manner. This represented a yield of about 13 percent of the theoretical yield of copolymer, and a conversion rate of 3.5 percent by hour. The copolymer had a chlorine content of 46.0 percent by weight, indicating the presence of 81 percent by weight of combined vinyl chloride. The copolymer had a reduced viscosity of 0.23 in cyclohexanone at 30° C. using a solution of 0.2 gram of polymer per 100 milliliters of solution.

EXAMPLE XIX

*Copolymerization of 2-(octylmercapto)ethyl vinyl ether with vinyl chloride*

To a nitrogen-purged Pyrex polymerization tube (14 mm. by 12″) were charged 7.0 grams of vinyl chloride, 3.0 grams of 2-(octylmercapto)ethyl vinyl ether and 0.1 gram of azo-bis-isobutyronitrile. After purging the tube with nitrogen, the tube was cooled in a Dry Ice bath and sealed. The tube was then rocked in a water bath maintained at a temperature of 50° C. for 4 hours. At the end of this time, the tube was opened and isopropanol was added to the contents thereof. The resulting mixture was filtered and the precipitate collected was dried in a forced air oven at a temperature of 50° C. About 1.0 gram of copolymer was recovered in this manner. This represented a yield of about 10 percent of the theoretical yield of copolymer, and a conversion rate of 2.5 percent per hour. The copolymer had a chlorine content of 47.9 percent by weight, indicating the presence of 84.4 percent by weight of combined vinyl chloride. The copolymer had a reduced viscosity of 0.24 in cyclohexanone at 30° C. using a solution of 0.2 gram of polymer per 100 milliliters of solution.

EXAMPLE XX

*Copolymerization of 2-(butylmercapto)ethyl vinyl ether with vinylidene chloride*

To a nitrogen-purged Pyrex polymerization tube (14 mm. by 12″) were charged 7.0 grams of vinylidene chloride, 3.0 grams of 2-(butylmercapto)ethyl vinyl ether and 0.1 gram of azo-bis-isobutyronitrile. After purging the tube with nitrogen, the tube was cooled in a Dry Ice bath and sealed. The tube was then rocked in a water bath maintained at a temperature of 50° C. for 6 hours. At the end of this time, the tube was opened and isopropanol was added to the contents thereof. The resulting mixture was filtered, and the precipitate collected was dried in a forced air oven at a temperature of 50° C. About 2.1 grams of copolymer were recovered in this manner. This represented a yield of about 21 percent of the theoretical yield of copolymer, and a conversion rate of 3.5 percent per hour. The copolymer had a chlorine content of 60.2 percent by weight, indicating the presence of 82.2 percent by weight of combined vinylidene chloride. The copolymer had a reduced viscosity of 0.129 in dimethylformamide at 30° C. using a solution of 0.2 gram of polymer per 100 milliliters of solution.

What is claimed is:

1. The 2-vinyloxyethyl sulfide compounds represented by the general formula

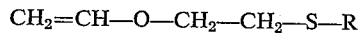

$$CH_2=CH-O-CH_2-CH_2-S-R$$

wherein R is a hydroxyhydrocarbon radical free of aliphatic unsaturation having from one to twenty carbon atoms with no more than one hydroxyl group attached to any given carbon atom.

2. 3-thia-6-oxa-7-octenol.

3. An interpolymer of a 2-vinyloxyethyl sulfide compound represented by the general formula

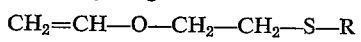

$$CH_2=CH-O-CH_2-CH_2-S-R$$

wherein R is a hydroxyhydrocarbon radical free of aliphatic unsaturation having from one to twenty carbon atoms with no more than one hydroxyl group attached to any given carbon atom, and at least one other polymerizable organic compound.

4. A process for producing an interpolymer of a 2-vinyloxyethyl sulfide compound represented by the general formula $$CH_2=CH-O-CH_2-CH_2-S-R$$

wherein R is a hydroxyhydrocarbon radical free of aliphatic unsaturation having from one to twenty carbon atoms with no more than one hydroxyl group attached to any given carbon atom, and at least one other polymerizable organic compound, which comprises heating said 2-vinyloxyethyl sulfide compound with at least one other polymerizable organic compound in the presence of a vinyl polymerization catalyst.

5. A copolymer of 3-thia-6-oxa-7-octenol and vinylidene chloride.

6. A copolymer of 3-thia-6-oxa-7-octenol and acrylonitrile.

References Cited by the Examiner

UNITED STATES PATENTS

| 2,707,714 | 5/1955 | Conklin et al. | 260—609 |
| 2,806,884 | 9/1957 | Tapp et al. | 260—609 |
| 2,877,214 | 3/1959 | Opheim et al. | 260—79.7 |
| 2,906,741 | 9/1959 | Hwa | 260—79.7 |

OTHER REFERENCES

E. Emmet Reid: Organic Chemistry of Bivalent Sulfur, volume I, published by Chemical Publishing Co., Inc., New York, 1958, page 381 relied upon.

LEON J. BERCOVITZ, *Primary Examiner.*

H. N. BURSTEIN, J. R. LIBERMAN, DONALD E. CZAJA, *Examiners.*